United States Patent [19]

Naito

[11] Patent Number: 4,611,319
[45] Date of Patent: Sep. 9, 1986

[54] DISC DRIVE CONTROL SYSTEM

[75] Inventor: Ryuichi Naito, Tokorozawa, Japan

[73] Assignee: Pioneer Electronic Corporation, Tokyo, Japan

[21] Appl. No.: 542,189

[22] Filed: Oct. 14, 1983

[30] Foreign Application Priority Data

Oct. 15, 1982 [JP] Japan .................. 57-180633
Oct. 15, 1982 [JP] Japan .................. 57-180634
Oct. 15, 1982 [JP] Japan .................. 57-180635
Oct. 15, 1982 [JP] Japan .................. 57-180636

[51] Int. Cl.$^4$ ............................................. G11B 7/00
[52] U.S. Cl. ...................................... 369/47; 358/342; 369/50; 369/59; 369/133; 369/189; 369/240
[58] Field of Search .................. 358/342; 369/47, 59, 369/133, 240, 50, 41, 32, 189; 360/69, 73

[56] References Cited

U.S. PATENT DOCUMENTS

| | | | |
|---|---|---|---|
| 4,423,498 | 12/1983 | Kimura et al. | 369/50 X |
| 4,466,089 | 8/1984 | Wachi | 369/47 X |
| 4,495,474 | 1/1985 | Nishikawa et al. | 331/17 X |
| 4,539,666 | 9/1985 | Wachi | 369/59 X |

Primary Examiner—Robert L. Richardson
Attorney, Agent, or Firm—Fleit, Jacobson, Cohn & Price

[57] ABSTRACT

A disc drive control system for controlling the drive of a disc carrying a binary digital signal including clock information of a predetermined frequency wherein the digital signal includes an information signal portion to be recorded and an synchronizing signal portion which includes successive maximum periods of inversion (transitions). The system includes a detection means for detecting the period of the transition of the synchronizing signal and producing a detection signal, (frame sync servo signal) disc a control means for producing a disc drive control signal for controlling a disc drive means. The drive control signal is produced in accordance with the detection signal prior to a period in which the drive control signal is produced in accordance with a reproduced clock signal (playback clock and playback frame sync signals), whereby eliminating the problem that the driving speed of the disc may be controlled in accordance with an erroneously reproduced clock signal.

6 Claims, 27 Drawing Figures

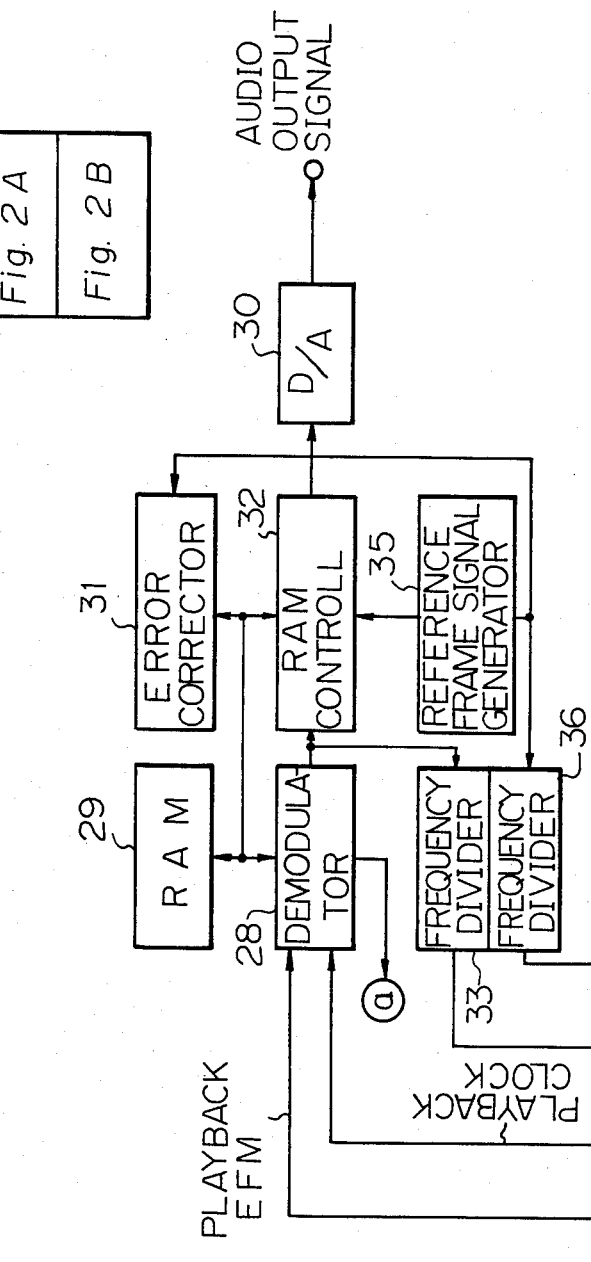

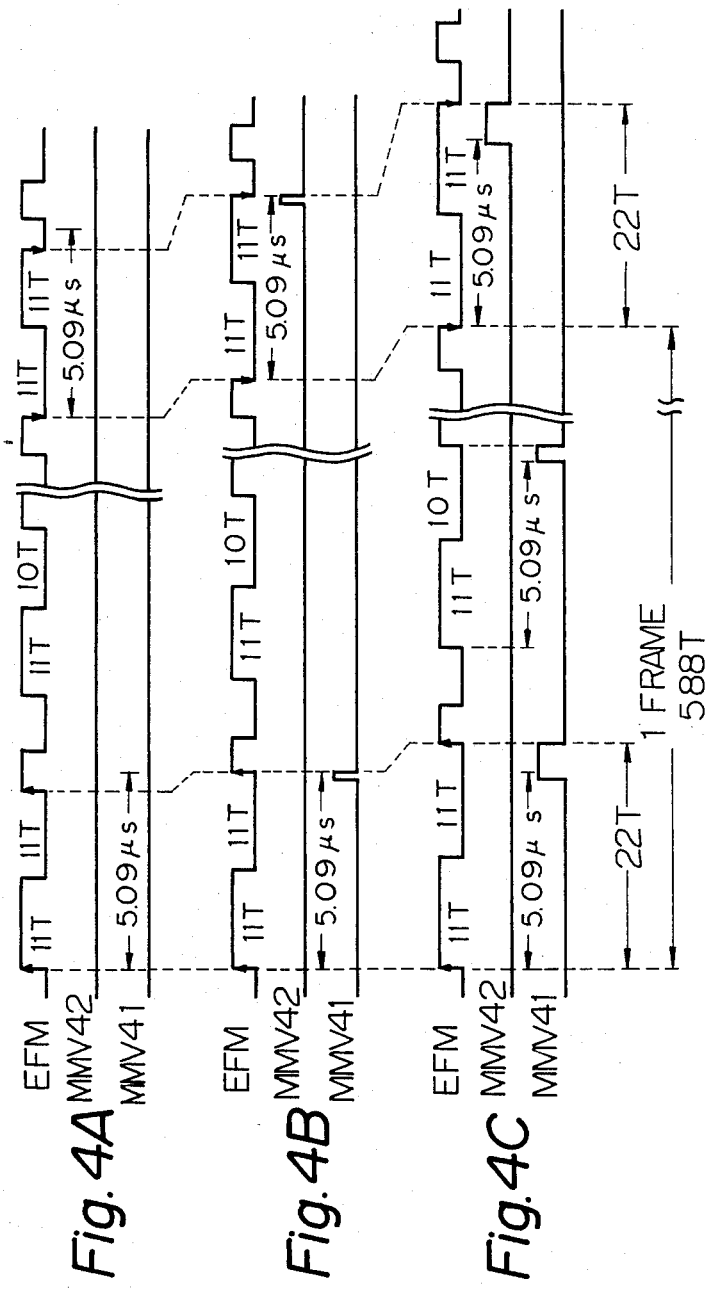

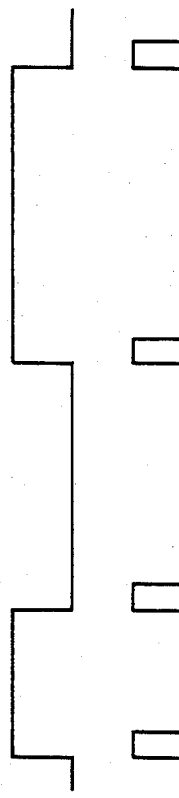
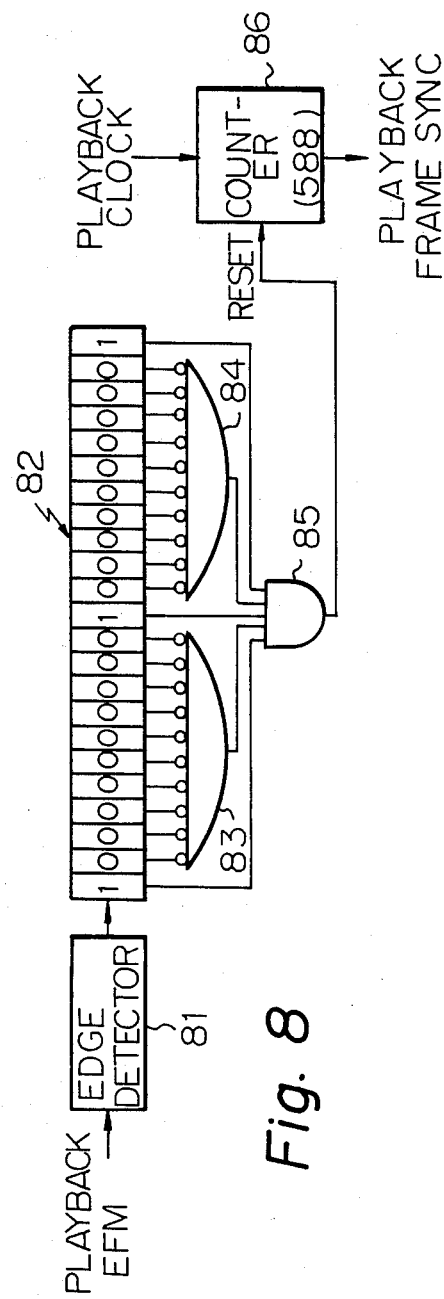
Fig. 7A
Fig. 7B
Fig. 7C
Fig. 8

DISC DRIVE CONTROL SYSTEM

BACKGROUND OF THE INVENTION

The present invention relates to a disc drive control system, and more specifically to a servo control system for controlling the driving of a disc on which a digital signal is recorded.

DESCRIPTION OF THE BACKGROUND INFORMATION

In recent years, research has been undertaken in the field of digital recording technique in which an analog signal such as an audio signal is recorded on a recording medium in the form of a binary (zero or one) digital signal (hereinafter digital signal) by means of the PCM (Pulse Code Modulation) method, and systems for playing back the recorded signal of this type have been put to practical use. In this case, the method of modulation is generally selected from among those which allow so-called self clocking, in order to facilitate the demodulation of the digital signal. In addition to raise the recording density, the recording of information on the disc is generally performed in a CLV (Constant Linear Velocity) system in which the rotation of the disc is varied to maintain the speed of the recording track constant, instead of employing a CAV (Constant Angular Velocity) system. In the case of playback of information recorded in accordance with the CLV system, it is required to control the speed of rotation of the disc so that the linear velocity of the recording track is constant. In order to effect this type of speed control, a spindle servo system is employed which is controlled in accordance with a playback clock signal having a predetermined frequency derived from clock information contained in a playback signal which is picked up from the recording disc.

EPM (Eight to Fourteen Modulation) is one of the modulation systems in which the self-clocking, i.e., the reproduction of the clock information from the playback signal is enabled. In the case of EFM, each eight bits of the data train which is to be recorded is converted to a fourteen bit data train.

In the playback system, the clock signal is generated from a playback signal such as an EFM signal picked up from the recording disc by the sequential steps of differentiation the playback signal, full-wave rectification of the differentiated signal, and pick up of the clock signal from the rectified signal preferably by means of a phase locked loop (PLL) circuit.

In prior art disc drive systems, a problem existed in that it was sometimes difficult or impossible to detect the clock signal due to so called spurious signals in the input signal of the PLL circuit. Therefore, the pick up of clock information becomes difficult when the speed of rotation of the disc is not correct, especially during a starting period of the disc drive, or when the pickup signal is first obtained from a silent portion of the recording disc. Further, during a search operation in which a pick up position is rapidly translated along a radial direction of the disc, pick up of the clock information is difficult. Moreover, a relatively long time is required for the system to return to a normal state of picking up the clock information once the pick up signal has been lost.

SUMMARY OF THE INVENTION

An object of the present invention is therefore to improve the above drawvbacks of the prior art systems and to provide a disc drive control system in which the speed of the rotation of the disc can be rapidly controlled to the correct value even if the pick up of the clock information is not available, whereby facilitating a rapid return to the normal state of picking up the clock information.

Another object of the present invention is to provide a disc drive servo system which the speed of rotation of the disc is rapidly controlled to the correct value when the disc is initially driven starting from stand still.

A further object of the invention is to provide a disc drive control system in which the time required for the search operation is minimized by discriminating an address information while the search operation is being effected.

Still further object of the invention is to provide a disc drive control system in which the PLL circuit can be released from a mislock state where the detection of the clock information is difficult, thereby enabling rapid return to the normal state of correct control of the disc drive in accordance with a playback clock information.

According to the present invention, a disc drive control system for controlling the drive of a disc carrying a binary digital signal including a clock information of a predetermined frequency, the digital signal including information signal portions in which a transition or a position of inversion of the digital signal is determined in accordance with an information signal and synchronizing signal portions having n times (n being an integer equal to or greater than 1) successive maximum periods of the inversion, comprises a pickup means for detecting the digital signal on the disc, a detection means responsive to an output signal of the pickup means for detecting a period of synchronizing signal portions and produding a detection signal indicative of the period of synchronizing signal, a clock detection means responsive to the output signal of the pickup means for detecting the clock information of the predetermined frequency and producing a playback clock signal, a control means responsive to the detection signal and the playback clock signal, for producing a disc drive control signal in accordance with the detection signal during a time period and in accordance with the playback clock signal after the time period, and a disc drive means for driving the disc in accordance with the drive control signal.

According to another aspect of the invention, a disc drive control system for controlling the drive of a disc carrying a binary digital signal, the digital signal including information signal portions in which a position of inversion of the digial signal (the transition) is determined in accordance with an information signal and synchronizing signal portions have n times (n being an integer equal to or greater than 1) successive maximum periods of the inversion, comprises a pickup means for detecting the digital signal on the disc, a detection means responsive to an output signal of the pickup means for detecting a period of synchronizing signal portions and produding a detection signal indicative of the period of synchronizing signal, a control means responsive to a start signal and the detection signal, for producing a disc drive control signal having a first level for accelerating the rotation of the disc by fixing a strength of the drive control signal to a predetermined level for a predetermined period after a receipt of the start signal and a second level in which the drive control signal is produced in accordance with the detection signal, and a disc drive means for driving the disc in accordance with drive control signal.

According to further aspect of the invention, a disc drive control system for controlling the drive of a disc carrying a binary digital signal, the digital signal including address information signal portions and synchronizing signal portions having n times (n being an integer equal to or greater than 1) successive maximum periods of the inversion, comprises a pickup means for detecting the digital signal on the disc, a detection means responsive to an output signal of the pickup means for detecting a period of synchronizing signal portions and produding a detection signal indicative of the period of synchronizing signal, a control means responsive to a search command signal and the detection signal for producing a disc drive control signal during a search operation initiated by the search command signal and having a plurality of alternating periods of fast translation of the pickup means relative to the disc and comparison between an address information picked up from the disc and a target address, the drive control signal having a first level for maintaining a speed of rotation of the disc substantially constant by fixing a strength of the drive control signal to a predetermined level while the pickup means is translated in the radial direction of the disc, and a second level in which the drive control signal is produced in accordance with the dection signal while the translation of the pickup means is stopped and an address information is picked up from the output signal of pickup means, and a disc drive means for driving the disc in accordance with the drive control signal.

According to still another aspect of the invention, a disc drive control system for controlling the drive of a disc carrying a binary digital signal including a clock information of a predetermined frequency, the digital signal including information signal portions in which a position of inversion of the digital signal (the transition) is determined in accordance with an information signal and synchronizing signal portions having n times (n being an integer equal to or greater than 1) successive maximum periods of the inversion, comprises a pickup means for detecting the digital signal on the disc, a detection means responsive to an output signal of the pickup means for detecting a period of synchronizing signal portions and produding a detection signal indicative of the period of synchronizing signal, a clock detection means responsive to the output signal of the pickup means for detecting the clock information of the predetermined frequency and producing a playback clock signal, the clock detection means taking the form of a phase locked loop circuit which can be locked on an input signal having a predetermined frequency range around the predetermined frequency of clock information, a control means responsive to the detection signal, for producing a disc drive control signal in accordance with the detection signal, and a disc drive means for driving the disc in accordance with the drive control signal, wherein an oscillation frequency of the phase locked loop circuit is forcedly swept for preventing the phase locked loop circuit from a locking at a spurious frequency when a correct demodulation of the synchronizing signal in accordance with the playback clock signal is not possible while the disc is driven in accordance with the drive control signal produced from the detection signal.

The foregoing and other objects and advantages of the present invention will become more clearly understood upon review of the following description taken in conjunction with the accompanying drawings.

BRIEF DESCRIPTION OF THE DRAWINGS

FIG. 2 shows the juxtaposition of FIGS. 2A and 2B. FIGS. 2A and 2B are a block diagram of the disc drive servo system according to the present invention;

FIGS. 4A to 4C are timing charts showing the operation of the frame sync servo unit of FIG. 3;

FIGS. 7A to 7C are waveform diagrams showing the operation of the PLL circuit of FIG. 7;

FIG. 8 is a circuit diagram of the demodulator shown in FIG. 2;

DETAILED DESCRIPTION OF A PREFERRED EMBODIMENT

Figure 1:
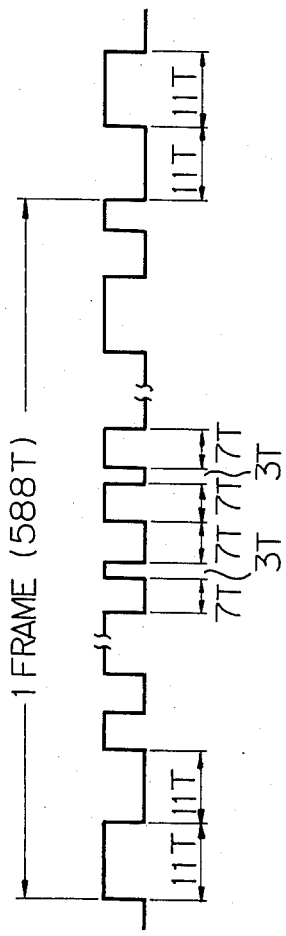
FIG. 1 is a waveform diagram illustrating the format of an exemplary binary signal to be recorded on a digital recording medium, for example a disc.

FIG. 1 shows an example of the format of an information signal modulated in accordance with the EFM. The signal is made up of a plurality of frames each of which is constituted by five hundred and eighty eight (588) number of channel bits with a period of T. The data signal to be recorded is modulated by a conversion process in which each eight bits of the digital signal are translated into fourteen channel bits in accordance with a predetermined conversion table (for example look up table embedded in a ROM) associated with the EFM. A unit of seventeen channel bits is then formed by adding three adjusting channel bits.

Each channel bit of the signal is recorded in the form of the NRZI, i.e., if the value of the channel bit is "1", then the signal is inverted from a logical high level (H) to logical low level (L) or from logical low level to logical high level. If the value of the channel bit is "0", the signal is not inverted At the leading portion of each frame is positioned a frame sync (synchronizing) signal in which the first channel bit is logic "1", the second through the eleventh channel bit are all logic "0", the twelfth channel bit is logic "1", the thirteenth through the twenty-second channel bits are logic "0", and the twenty-third channel bit is logic "1". On the basis of this frame sync signal, control signals are disposed at predetermined positions of the signal of one frame having five hundreds and eighty eight channel bits.

In addition, the signal is further processed so that more than two and less then ten digital zeros (0) are disposed between each adjacent digital one (1). In other words, the minimum and the maximum intervals of inversion are determined to be 3T and 11T respectively (T being the duration of one channel bit). Moreover, the signal is processed so that no successive two maximum intervals of inversion are present in any portion of the signal other than the portion of the frame sync signal.

The playback process of this signal is performed in accordance with the clock information which is reproduced by a process in which a PLL (Phase Locked Loop) circuit is provided with a signal equivalent to what would be obtained by a full wave rectification of a differentiation signal of the signal modulated in accordance with the above mentioned EFM process.

However, in the case of recording information such as a musical information, the digial signal may remain at a fixed pattern corresponding to the 0 level, especially during the so-called silent portion of the recording track. In this state, the EFM signal, i.e., the signal modulated by the EFM process will have positive or negative inversion at intervals of 7T, 3T, and 7T for instance. Thus, the EFM signal corresponding to the fixed pattern original signal may take the form of a time series signal which includes a plurality of repeating waveforms having a period of 17T (the sum of 3T, 7T, and 7T). Therefore, the input signal of the PLL circuit in the above described silent portion includes a bright line spectrum of the frequency of the clock information (4.3218 MHz) as well as a spurious component having energy peaks each of which has a frequency of a multiple of one seventeenth (254 KHz) of the clock frequency. Since the frequency of this spurious signal is close to the frequency of an in-phase clock signal, it is generally impossible to distinguish the clock signal from the spurious signal. Therefore, the PLL circuit for picking up the clock signal may erroneously lock on the spurious frequency having a high energy level. Thus, the correct reproduction of the clock information, and further the accurate playback of the recorded information may become difficult. Moreover, if the frequency error of the input signal of the PLL circuit is significant, the locking of the PLL circuit itself becomes impossible.

Figure 2B:
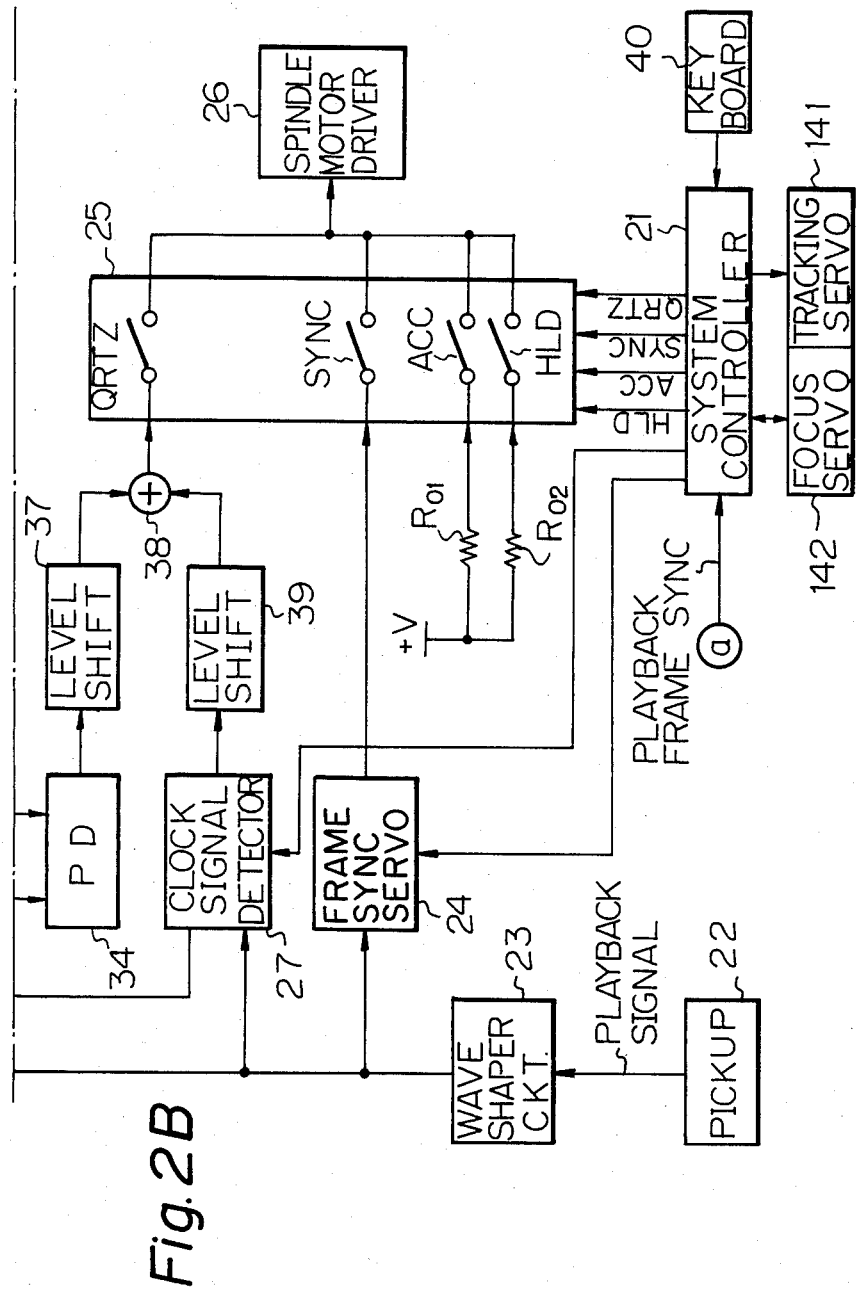

Reference is now made to the combination of FIGS. 2A and 2B, which shows a block diagram of an embodiment of the disc drive control system according to the present invention. In that figure, a part corresponding to the spindle control system for controlling the speed of rotation of the recording disc is especially illustrated in detail.

Before the explanation of respective circuit elements, the major operations of the spindle servo control system will be explained briefly. The first operation is an acceleration (ACC) operation for raising the rotational speed of the spindle motor by applying a constant high level driving current to the spindle motor.

The second operation is a hold (HLD) operation for maintaining a constant speed of rotation of the spindle motor against a frictional resistance of the rotation system, by supplying a relatively low level constant driving current to the spindle motor.

The third operation is a frame sync servo (SYNC) operation for directly generating a frame sync servo signal (without reproducing the playback clock signal) and controlling the speed of rotation of the disc so that the linear velocity of the rotating recording track is almost equal to the rated linear velocity. Lastly, the fourth operation is a quartz servo (QRTZ) operation for controlling the speed of rotation of the disc to obtain an accurate linear velocity of the recording track, in accordance with a frequency error signal which is obtained by comparing a signal corresponding to the frequency of the playback clock signal reproduced from the playback RF (Radio Frequency) signal with a predetermined reference signal, and in accordance with a phase error signal which is obtained by comparing the phase of the frame sync signal detected from a demodulation signal obtained by demodulating the EFM signal in accordance with the clock signal, with the phase of a reference frame sync signal having a frequency of 7.35 KHz.

One of these four operations of the servo control system is alternatively selected in accordance with four kinds of control signals from a system controller 21 shown in FIG. 2B, namely an ACC signal, a HLD signal, a SYNC signal, and a QRTZ signal.

During the time in which the rotation of the disc is not necessary, for example during a stop mode or an eject mode, all of these control signals are not produced and the driving current of the spindle motor is reduced to zero.

The operation of the system will now be explained with reference to FIGS. 2A and 2B. As shown, an output signal from a pickup 22 is applied to an wave shaper 23 where the wave form of the input signal is corrected to form an EFM signal. The thus produced EFM signal from the wave shaper 23 is then applied to a frame sync servo unit 24 in which a frame sync servo signal is produced. The frame sync servo signal is then applied to a spindle motor driver 26 via a switch circuit 25. Thus, the driving of the spindle motor is controlled at the SYNC operation.

In the case of the ACC operation, a driving current having a constant voltage level $+V$ is applied to the spindle motor driver 26 via a resistor $R_{01}$ of a low electric resistance. Therefore, a driving current of a constant high current level or a constant high voltage level is supplied to the spindle motor to perform the ACC operation.

In the case of the HLD operation, the driving current of the spindle motor is applied via a resistor $R_{02}$ whose elelectric resistance value is selected by far greater than that of the resistor $R_{01}$ in order to perform the HLD operation.

The output signal of the wave shaper 23 is also applied to a clock signal detector 27 which consists of a PLL (Phase Locked Loop) circuit which locks on a clock information signal of a predetermined frequency contained in the playback information. The playback clock signal reproduced in the clock signal detector 27 (also referred to as the PLL circuit 27 hereafter) is then applied to a demodulator 28 together with the output signal of the wave shaper 23, in which the input signals are converted into a predetermined digital signal, for example a NRZ signal. The thus obtained demodulation signal is then applied to a RAM (Random Access Memory) 29 and also to a D/A converter 30 in accordance with a predetermined constant read out clock pulse signal, in which the demodulation signal is converted to an analog information which is to be used as an audio output signal.

The reference numeral 31 indicates an error corrector in which a bit error or a burst error is corrected. The operation of this error corrector 31 and the RAM 29 is controlled in accordance with the operation of a RAM controller 32.

The demodulator 28 also has the function of detecting a playback frame sync signal from the EFM signal in accordance with the playback clock signal, and the RAM controller 32 is controlled in accordance with the timing of the generation of the playback frame sync signal. On the other hand, a frequency divider 33 is provided to receive the playback frame sync signal, and the divider output signal from the frequency divider 33 is then applied to one of two input terminals of a phase detector 34. The other input terminal of the phase detector 34 is applied with an output signal of a frequency divider 36 which receives an output signal of a reference frame signal produced in a reference frame signal generator 35. An output signal of the phase detector 34 is then applied to an an adder circuit 38 after passing through the level control process of a level shift circuit 37.

In the PLL circuit 27, an output signal of a loop filter (denoted at 73 in FIG. 5) is compared with a predetermined reference signal and a level shift circuit 39 is provided to adjust the level of a comparison signal from the PLL circuit 27. An output signal of the level shift circuit 39 is applied to the other input terminal of the adder circuit 38 as the frequency error signal. An output signal of the adder circuit 38 is then applied to the spindle mortor driver 26 as a quartz servo control signal. Also, the playback frame sync signal from the demodulator 28 is applied to the system controller 21. This playback frame sync signal will be used for controlling the position of the switch circuit 25 to perform the selection of the spindle servo operations, however, the detailed explanation thereof will be made later.

The system controller 21 also produces a control signal for sweeping (in other words, oscillating) or forcedly sweeping (oscillating) the frequency of a VCO (Voltage Controlled Oscillator) of the PLL circuit 27, however, a detailed explanation thereof will be also made later.

In addition, the refrence numeral 40 indicates a key board which may be mounted in a control panel of the playback system or may take the form of a control board of a remote control system. The reference numerals 141 and 142 respectively denote a tracking servo system and a focus servo system whose operations are respectively controlled by the system controller 21.

Figure 3:
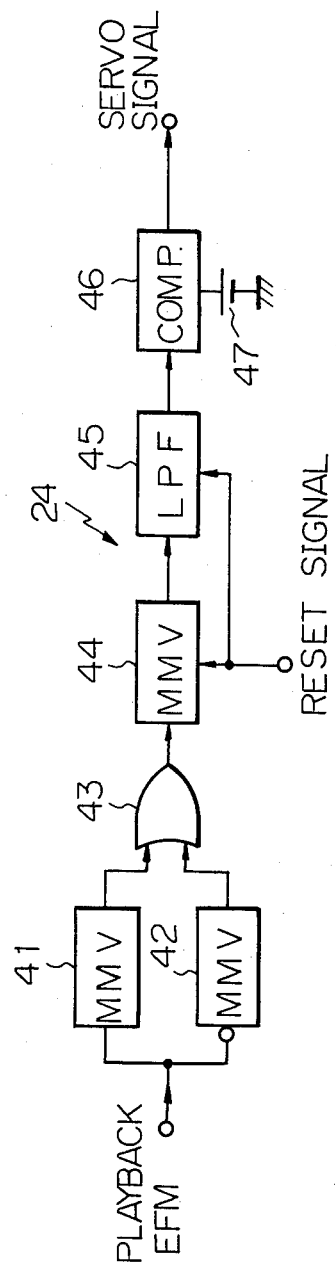
FIG. 3 is a block diagram of the frame sync servo unit shown in FIG. 2.

Turning to FIG. 3, an example of the frame sync servo unit 24 will be explained. The playback EFM signal as shown in FIG. 1, is applied to a pair of retrigerable monostable multivibrators (MMV) 41 and 42. The MMV 41 is triggered by a positive inversion (from low level to high level) of input signal and produces an L (low) level output signal for a predetermined time period $T_o$. Similarly, the MMV 42 is triggered by a negative inversion (transition) (from H evel L level) of an input signal and produces an L level output signal for the same predetermined time period $T_o$. These L level output signals of the MMV's 41 and 42 are applied to another retriggerable monovibrator (MMV) 44 as a trigger signal via an OR gate 43. The time period $T_o$ of the MMV's 41 and 42 is selected so as to substantially correspond to the duraton of the frame sync signal of 22T which is twice as long as the period of the maximum interval of inversions (transitions) (precisely, the time period $T_o$ is shorter than 22T by 20-30 ns (nano seconds)).

An output signal having the pulse width $T_1$ of the MMV 44 is then applied to a low pass filter (LPF) in which an input signal is converted to a dc voltage signal which is to be compared with a predetermined reference level 47 in a comparator 46. The pulse width $T_1$ of the output signal of the MMV 44 is selected to be shorter than a period the frame sync signal (1/7.35 KHz ≈ 136 μs, for example) and preferably determined to be half the period of the frame sync signal.

An output signal of the comparator 46 is applied to the switch circuit 25 shown in FIG. 1 as a sync servo signal. In addition, the MMV 44 and the LPF 45 are appplied with a reset signal from outside. During the period in which the sync servo control is turned off, a time constant circuit formed by the MMV 44 and the LPF 45 is discharged by a timing of the reset signal and consequently the MMV 44 and the LPF 45 are reset to the initial state, by this operation, the setting time of the succeeding starting of the sync servo control is shortened.

The reason of providing a pair of MMV's 42 and 42 which are triggerred by the positive inversion and the negative inversion respectively, is that whether the frame sync signal portion of the EFM signal starts from the high level channel bit or from the low level channel bit is determined by the characteristic of the EFM signal. In other words, as shown in FIG. 1, the polarity of the start bit of the frame sync signal is not constant.

In operation, since the interval of the adjacent two leading edges or two trailing edges is equal to 22T only in the case of the frame sync signal, and the period of 22T will be 5.09 μs if the disc is rotated at a proper speed, the pulse width $T_o$ of the MMV's 41 and 42 is detemined to be shorter than the above mentioned 5.09 μs by the amount of 20-30 ns which is sufficient to trigger the MMV 44.

FIGS. 4A to 4C are timing charts showing the operation of the frame sync servo unit 24 of FIG. 3, and in which FIG. 4A shows a case in which the linear velocity of the recording track is faster than the rated value, FIG. 4B shows a case in which the linear velocity is equal to the rated value, and FIG. 4C shows a case in which the linear velocity is slower than the rated value. As shown in FIG. 4A, when the linear velocity is faster than the rating value, the a leading edge of the input signal of the MMV 41 will arrive before the elapse of the time period of 5.09 μs after the arrival of the former leading edge, so the MMV 41 is continuously triggerred and the level of the output signal remains at the low level. If the linear velocity is correct as shown in FIG. 4B, the interval of the leading edges will be equal to 5.09 μs only for the frame sync signal portion. Therefore, pulse signals having the pulse width of 20-30 ns are produced at the output terminal of the MMV 41 in synchronization with the frame sync signal. Finally, if the linear velocity is slower than the rated value as shown in FIG. 4C, the positive output pulses are produced by the MMV 41 both for the portion of the frame sync signal and for the other portion of the EFM signal. It will be understood that the output pulse signal of the MMV 42 is produced in the similar manner as above, and the expanation thereof is omitted.

Since the number of the output pulses of the OR gate 43 (FIG. 3) varies as the linear velocity of the recording track changes, as readily understood from the foregoing, an F/V (Frequency to Voltage) conversion signal of the playback signal can be obtained at the output terminal of the LPF 45 by a dc conversion of the input signal from the MMV 44 which produces a pulse train of a predetermined pulse width in accordance with the input signal from the OR gate 43.

More specifically, if the linear velocity of the disc is correct, the voltage level of the F/V conversion signal becomes equal to a predetermined value, because the MMV 44 is triggered only at the timing of frame sync signal. If the linear velocity of the recording track is faster than the rated value, the voltage level of the F/V conversion signal becomes equal to zero since the MMV 44 is not triggered. On the other hand, if the linear velocity is slower than the rated value, the voltage level of the F/V conversion signal becomes higher than the predetermined value since the MMV 44 is triggered at the timing of frame sync signal as well as at the other portions of the playback signal.

The frame sync servo control signal is then produced by comparing this F/V conversion signal with a reference level 47 which corresponds to a level that would be obtained in the case of the proper linear velocity.

Figure 5:
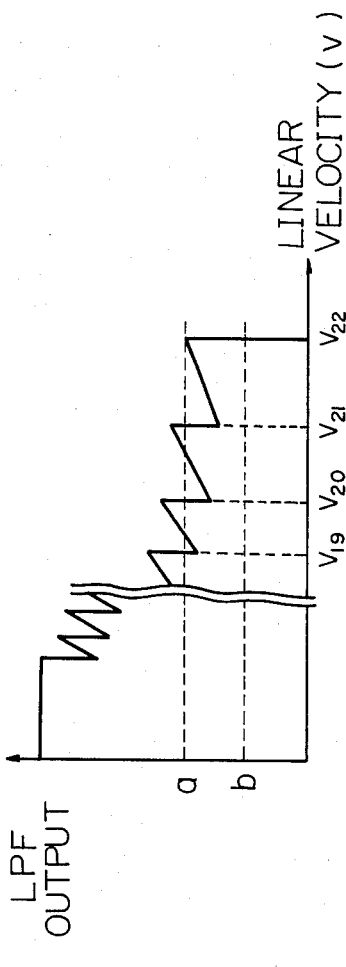
FIG. 5 is a graph illustrating an operational characteristic of the frame sync servo unit of FIG. 3.

Turning to FIG. 5, the manner of variation of the level of the F/V conversion signal, i.e. the output signal of the LPF 45 of FIG. 3, against the variation of the linear velocity of the recording track will be further explained.

If the speed of rotation of the disc is faster than the proper speed and the linear velocity is faster than the proper linear velocity $V_{22}$, the level of the F/V conversion signal is equal to zero, as previously mentioned with reference to FIG. 4A. When the disc is rotating slightly slower and the linear velocity is slightly slower than the proper value $V_{22}$, a trigger pulse of the MMV 44 is produced at the presence of each of the frame sync signal and the voltage level of the F/V conversion signal becomes equal to a level corresponding to 7.35 KHz of the frame sync signal. As the linear velocity slows down from the value of $V_{22}$, the level of the F/V conversion signal also reduces since the frequency of the frame sync signal itself reduces from the proper frequency. However, if the linear velocity further slows down and when it reaches a value $V_{21}$ which is slower than the proper value by around 4.5%, the time duration of 21 T becomes equal to the time duration corresponding to 22T at the proper speed (5.09 μs). With this reason, the trigger pulse signal of the MMV 44 is produced at the time of transitional periods of 21T contained in the playback signal, in addition to the timings of the frame sync signal which has a transitional period of 22T. Therefore, the voltage level of the F/V conversion signal rises rapidly at this value of linear velocity. After that, similar manner of change in the voltage level of the F/V conversion signal takes place as the linear velocity slows down. Further, when the linear velocity becomes very low, the MMV 44 is continuously triggerred since the trigger pulse of the MMV 44 is applied before the termination of the production of the output pulse signal. Therefore, the output signal of the LPF 45, i.e., the F/V conversion signal is saturated at a maximum value.

The servo signal is produced by subtracting the reference level 47 from the output signal of the LPF 45 having the output level characteritics of FIG. 5. It will be understood from the above explanation, if the reference level 47 is selected at around the value corresponding to the frequency of the frame sync signal 7.35 KHz (indicated by the level "a" in FIG. 5), there will be a plurality of stable points because the output signal level of the LPF bacomes equal to the reference level 47 at a plurality of points of linear velocity such as $V_{21}$, $V_{20}$, in addition to the point of rated linear velocity $V_{22}$. However, this problem can be solved when the reference level 47 is selected at a value sufficienltly lower than the value corresponding to 7.35 KHz, such as a half of that level, and in that case the stable point is present only at the proper linear velocity $V_{22}$.

Thus, the problem is solved by employing the circuit arrangement of FIG. 3 in which a time period n times (n=2 in this case) as long as the period of the maximum inversion (transition) of the playback signal is detected by a comparison with a reference period and a signal corresponding to the thus detected signal, i.e., the F/V conversion signal is generated. The servo control signal is then produced by comparing this F/V conversion signal with the reference value.

The speed of rotation of the disc can be controlled very accurately in a proper value by using this servo control signal for the driving of the spindle motor. This type of servo control, denoted as a frame sync servo control, is especially effective during a period in which the pick up of the clock information from the playback signal is not possible, such as a start up period of the rotation of the disc, or during a search operation which is performed for the searching of address information.

The detail of the quartz servo (QRTZ) operation will be explained hereafter.

A digital information played back from the recording disc rotating at a slightly fluctuating speed (having wow and flutter) is first applied to the RAM 29 of FIG. 2, and then read out from the RAM 29 in accordance with a predetermined clock signal, to be treated by the D/A conversion process. Thus, a high quality audio signal without wow and flutter can be produced. However in this case, since the capacity of the RAM 29 is limited, the speed of the writing of information into the RAM 29 and the speed of the reading out of information from the RAM must be balanced with each other. Otherwise, the RAM will be emptied or the writing information will overflow, and both of these condition will result in an interruption of the playback sound.

Accordingly, in the case of the playback of a music signal, the speed of rotation of the disc must be controlled so that the linear velocity is maintained constant, by means of the quartz servo operation. With this operation, the speed of writing of information in the RAM is controlled to be equal to the speed of reading out of information from the RAM. More specifically, phase of the dividing signal of the playback frame sync signal obtained from the demodulator 28 is compared with the phase of the dividing signal of the reference frame sync signal at the phase detectro 34, and the spindle motor is applied with a signal corresponding to this phase difference. Of course, the playback frame sync signal can be directly compared with the reference frame sync signal if the frequency is appropriate for that. However, since a suitable damping characteristic of the servo system can not be obtained only by detecting the phase error, it is necessary to introduce a frequency error signal and to mix with the phase error signal.

For this purpose, an output signal of the LPF of the PLL 27 for picking up the clock signal, the voltage level of which corresponds to the frequency of the playback clock signal, is compared with a reference level to produce a frequency error information. The output signal of the comparator is then combined with the phase error information signal at the adder circuit 38 to produce a quartz servo control signal. By this quartz servo (QRTZ) operation, an accurate servo control of the linear velocity is enabled and in which the writing speed and the reading out speed of the RAM 29 are equalized in average.

Therefore, the mode of servo control after the starting of the rotation of the disc is that the acceleration (ACC) operation is effected first to raise the speed of rotation of the spindle motor to a predetermined level, and the holding (HLD) operation is effected next. After that, the frame sync (SYNC) servo operation in which the control of the linear velocity around the rating value is possible even if the clock signal is not picked up, is selected. Finally when the generation of the playback frame sync signal is assured, the control system is switched to the quartz servo (QRTZ) operation to maintain the linear velocity of the recording track at constant value.

Figure 6:
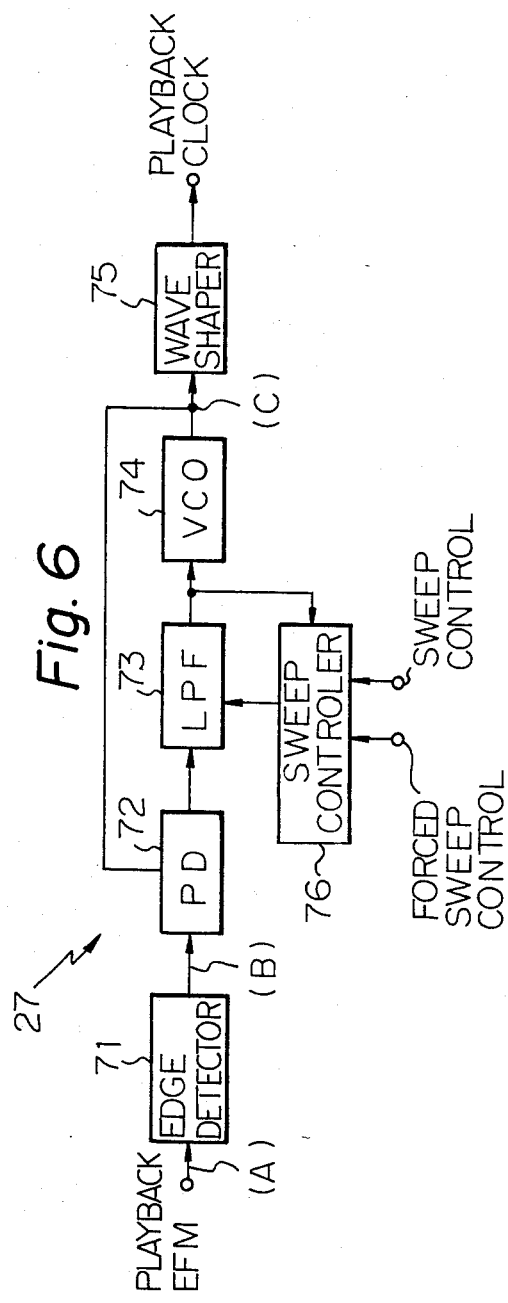
FIG. 6 is a block diagram of the PLL circuit shown in FIG. 2.

FIG. 6 is a block diagram showing the detailed construction of the PLL circuit 27 for picking up the self clock information from the playback EFM sugnal. The playback EFM signal (A) is applied to an edge detector 71 in which an edge pulse signal (B) synchronized with a timing of the level transition of the EFM signal (A). The pulse width of the edge pulse signal (B) is so determined as to be equal to a half the period the the proper clock signal. The edge pulse signal (B) is then applied to an input terminal of a phase detector 72 in which the input signal is compared with an output signal (C) of a VCO (Voltage Controlled Oscillator) 74. An output signal of the phase detector 72 indicative of the phase difference is then applied to an LPF (or a loop filter) 73 which in turn outputs a dc component of the input signal as a control signal of the VCO 74. An output signal of the VCO is then applied to a wave shaper 74 which corrects the input signal into a pulse signal to be used as the playback clock signal.

In addition, a sweep controller 76 responsive to the output signal of the LPF 73 is provided so as to shorten the time required for the locking of the PLL circuit. Specifically, the sweep controller 76 controls the frequency of the VCO 74 to sweep (or oscillate) between predetermined upper and lower frequency limits. Further, a forced sweep signal is applied to the sweep controller 76 so that an external disturbance is applied to the PLL circuit and a sweep operation which is faster than the normal sweep operation is effected to release a mislocked state of the PLL circuit. These sweep control and the forced sweep control are performed in accordance with the command from the system controller 21 shown in FIG. 2.

FIGS. 7A to 7C are waveform diagram showing various waveforms in the PLL circuit 27 of FIG. 6 at the operating state, respectively illustrating the signal (A) to signal (C) indicated in the figure. As shown from these figures, if the linear velocity of the recording track is correct, a sinusoidal wave of 4.3218 MHz (bright line spectrum component) is obtained and thus the clock signal is picked up.

FIG. 8 is a circuit diagram of the frame sync detector incorporated in the demodulator 28 shown in FIG. 2. In this circuit, the playback EFM signal is applied to an edge detector 81 which produces a pulse signal synchronized with the timing of the level transition of the playback EFM signal. The edge pulse signal produced in the edge detector 81 is then in turn written into a 23 bit shift register 82 which is controlled in accordance with the playback clock signal. Among the 23 bits output terminals of the shift register 82, ten bits from the second bit, i.e., from second bit to eleventh bit output terminals are connected to a NAND gate 83. Similarly, ten bits from the thirteenth bit, i.e., from thirteenth bit to twenty second bit output terminals are connected to a NAND gate 84. Output signals of the NAND gates 83 and 84 together with the first bit, twelfth bit, and twenty third bit of the shift register 82 are connected to a five input AND gate 85. An output signal of the AND gate 85 is then applied to a 588 bit counter 86 as a reset signal. The counter 86 receives the playback clock signal as an input signal and an output signal thereof is produced as the playback frame sync signal and applied to the system controller 21.

At a time when the frame sync signal is contained in the playback EFM signal and the frame sync signal has been just inputted, the content of the shift register 82 will be in the form of digital sequence illustrated in FIG. 8.

The output signal of the AND gate 85 is logical H (1) level in this state and the output signal would be logical L (0) level in all other conditions. Therefore, by employing a 588 bit counter for the counter 86, it will be reset to zero at every point of the end of the frame sync signal. Accordingly, the frame sync signal is derived as a logical L level signal at the time of detection of the playback frame sync signal. On the other hand, if the frame sync signal has not been applied when the counter 85 has counted up the 588 playback clock pulses, the counter 86 will not be reset and will produce a logical H level signal. Therefore, by monitoring the output signal of the counter 86, it is enabled to determine whether the frame sync signal is detected or not (whether the proper playback clock signal is detected or not).

Since the change over from the frame sync servo (SYNC) operation to the quartz servo (QRTZ) operation is performed only when this playback frame sync signal is detected, and in other words the change over to the quartz servo operation is not possible if the playback frame sync signal is not detected during the frame sync servo operation, the system is constructed so that forced sweep is effected to forcedly lock the PLL circuit 27 on the frequency of the clock information.

Figure 9:
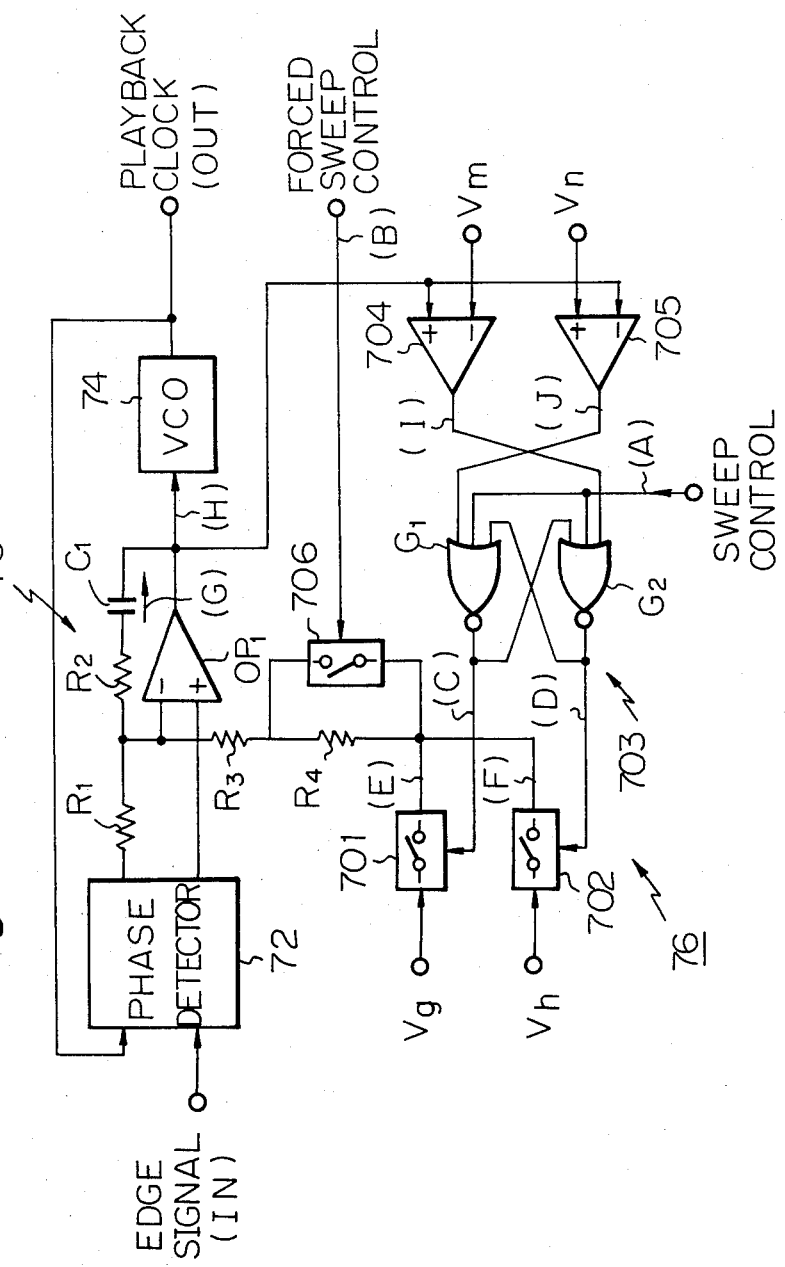
FIG. 9 is a block diagram of the sweep controller shown in FIG. 6.

FIG. 9 is a block diagram showing an example of the sweep controller 76 of FIG. 6, and in which like reference numerals denote like parts or corresponding circuit elements. As shown, a pair of dc voltage signal $V_g$ and $V_h$ having different voltage levels are applied to an operational amplifier $OP_1$ which forms a part of a loop filter 73, via a pair of switches 701 and 701 and throught a series resistors $R_3$ and $R_4$. The loop filter 73 is in the form of an active filter which is made up of a resistors $R_1$ and $R_2$ in addition to the operational amplifier $OP_1$ and a capacitor $C_1$. In order to control the operation of the switches 701 and 702, an R-S flipflop 703 which is made up of a couple of three input NOR gates $G_1$ and $G_2$ is provided. The switches 701 and 702 are respectively controlled in accordance with output signals (C) and (D) of the NOR gates $G_1$ and $G_2$.

Further, a pair of level comparators 704 and 705 are provided for determining an upper limit and a lower limit of the level of an output signal (H) of the loop filter 73 which is used as a control signal of a VCO 74. An inverting input terminal of the level comparator 704 is applied with a voltage signal Vm which determines the upper limit level, and at a noninverting input terminal of the level comparator 705 is applied with a voltage signal Vn which determines the lower limit level. The output signal of the LPF 73 is applied to a noninverting input terminal of the level comparator 704 and to an inverting input terminal of the level comparator 705. Output signals (I) and (J) of the level comparators 704 and 705 are respectively applied to the NOR gates $G_1$ and $G_2$ of the flipflop 703 as set-reset input signals. The other input terminals of the NOR gates $G_1$ and $G_2$ are applied with the sweep control signal (A) to perform the sweep control.

A switch 706 is connected across of the terminals of the resistor $R_4$, and short circuits the current through the resistor $R_4$ when the forced sweep signal (B) is applied thereto.

Figure 10:
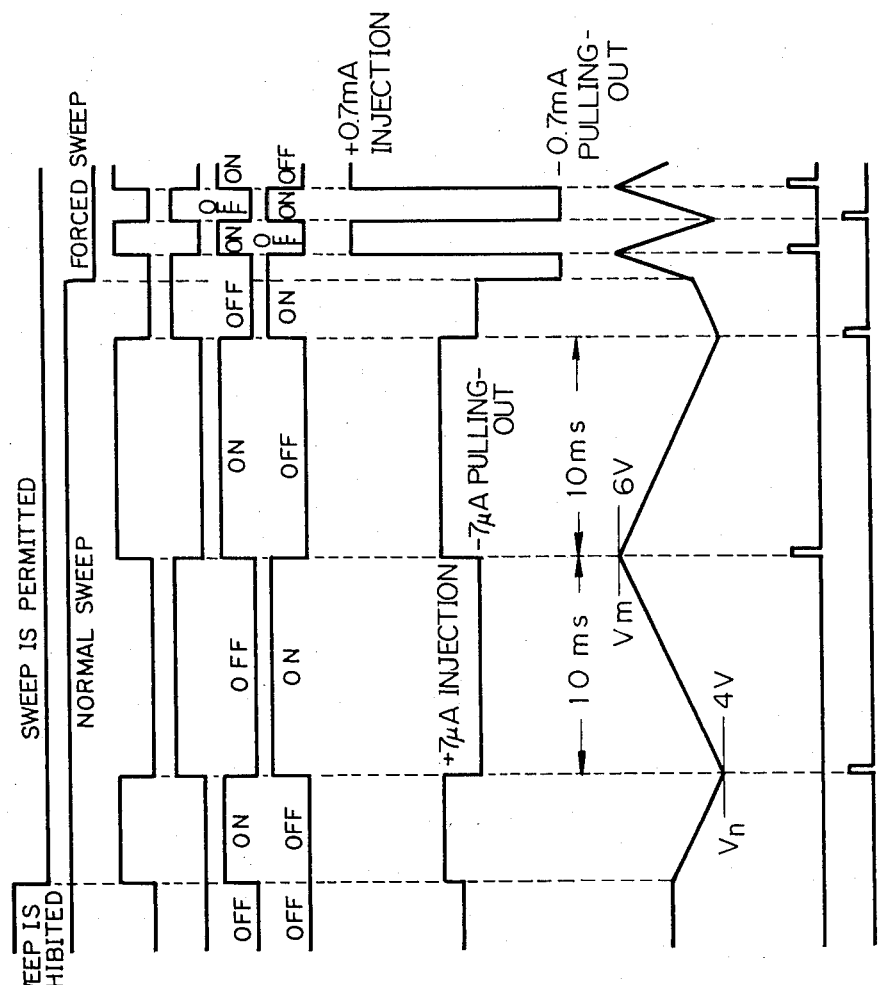
FIGS. 10A to 10J are timing charts showing the operation of the sweep controller of FIG. 9.

FIGS. 10A to 10J are waveform diagram illustrating the operation of the circuit of FIG. 9, in which FIG. 10A to FIG. 10J respectively show the waveforms of signals (A) to (J) of FIG. 9. In addition, FIGS. 10E and 10F are timing charts showing the on/off operation of the switches 701 and 702, and FIG. 10G shows an waveform of a charge/discharge current of the capacitor $C_1$ of the loop filter 73.

As shown, when the sweep control signal (A) is in the H level, the flipflop 703 is clamped to the reset state and no sweep operation takes place. When the sweep control signal (A) turns to the L level, the flipflop 703 is released from the reset state and the sweep operation is enabled. It is assumed in the following description that the forced sweep signal is in the H level and the switch 706 is turned off at first. If the switch 701 turns on in this state, the capacitor $C_1$ is applied with the charging current as shown in FIG. 10G, and level of the output signal of the LPF 73 reduces gradually as shown in FIG. 10H. When the output signal of the LPF reaches the lower limit level Vn (4 V for example), the comparator 705 produces such an output signal as shown in FIG. 10J to set the flipflop 703. Accordingly, the output signals of the flipflop 703 are inverted as shown in FIGS. 10C and 10D, and the switches 701 and 702 are turned off and on respectively. Therefore, a negative voltage is applied to the capacitor $C_1$ and a discharge of the capacitor $C_1$ takes place as shown in FIG. 10G. Accordingly, the output signal of the LPF 73 gradually rises from the lower limit level Vn to the upper limit level Vm (6 V for example) as shown in FIG. 10H.

When the output signal level of the LPF 73 reaches the upper limit level Vm, the comparator 704 is operated to produce a signal to reset the flipflop 703, the positions of the switches 701 and 702 are inverted and the output signal level of the LPF 73 starts to gradually reduce from the upper limit Vm to the lower limit Vn once more as shown in FIG. 10H. The sweep operation in which the oscillation output signal of the VCO 74 is repeatedly increased and decreased within a predetermined range, is thus performed. For example, the sweep operation is performed within the range of ±200 KHz around 4.3218 MHz, within the time period of 10 ms. Since this sweep operation is relatively slow and effects a small external disturbance upon the PLL circuit, the PLL circuit will not be unlocked once it is locked on the playback clock signal. In addition, since the sweep range is ±200 KHz, which is narrower than the inversion of the spurious signal, the PLL circuit is prevented from mislocking on the spurious signal.

In the event that the PLL circuit is erroneously locked on the spurious signal during searching operation, the forced sweep control signal (B) turns to the L level for releasing the PLL circuit from the mislocking state, and the switch 706 turns on as the result. Accordingly, the resistor $R_4$ is short circuited and the charging and discharging current of the capacitor $C_1$ is raised to a maximum value and the speed of the sweep operation becomes by far faster than the normal sweep operation (100 times faster, as an example). Timing charts of the signals of the circuit is illustrated in the right hand side portion of the FIGS. 10A to 10J. As shown, the PLL circuit is applied with an external disturbance of a high amplitude and the PLL circuit is not able to maintain the locked state, so that the PLL circuit is released from the mislocked state. Thus, the forced sweep operation is initiated. Since a relatively short duration (for example 10 s) of the forced sweep control signal (B) is required for release the PLL circuit from the mislocked state, the system controller 21 produces the L level froced sweep control signal (B) for 10 s and then raises the level of the control signal (B) to the H level. After that, the speed of the sweep operation will return to the normal speed. The system controller 21 will then monitor the presence or absence of the frame sync signal again and effects the forced sweep operation if the frame sync signal is not detected after the elapse of a predetermined time period (for example, 10 ms: a period of one sweep operation shown in FIG. 9). Thus the PLL circuit is correctly locked on the playback clock signal by effecting these operations until the frame sync signal is detected.

Figure 11:
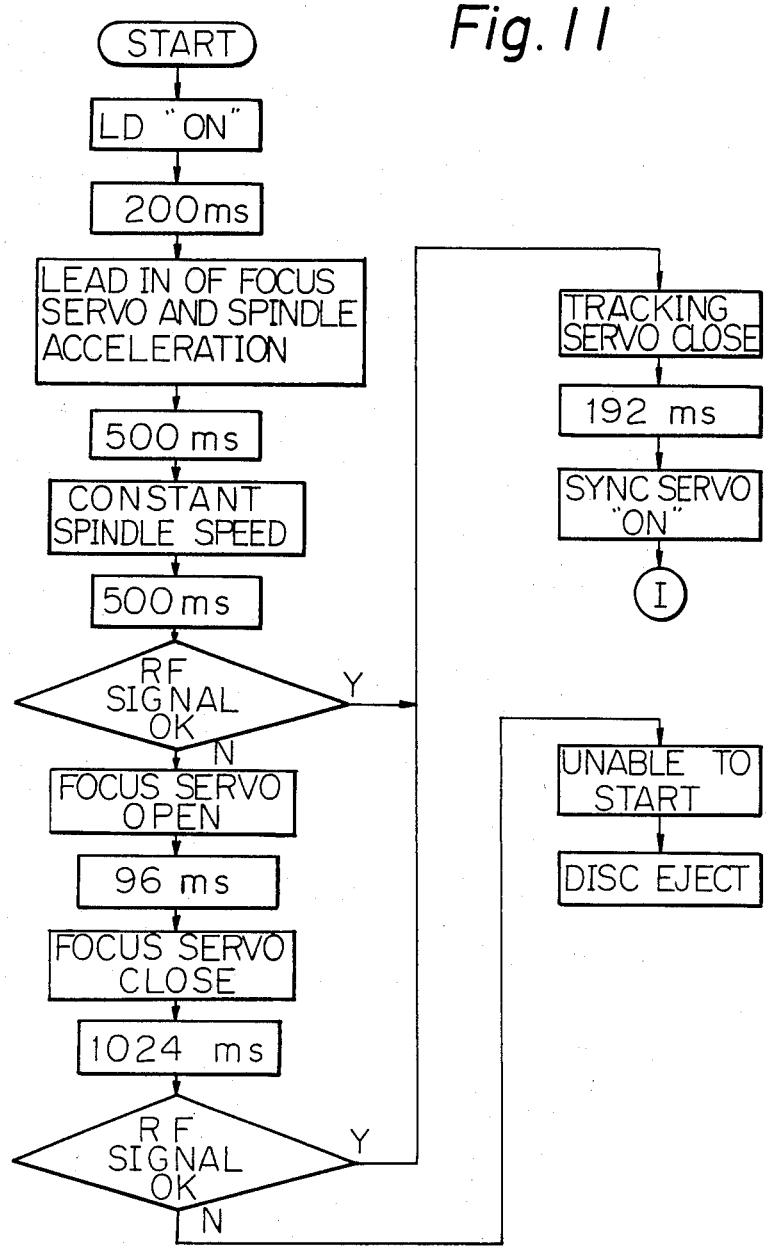
FIGS. 11 and 12 (when combined) are a flow chart showing the operation during a starting period of the rotation of the disc.
Figure 12:
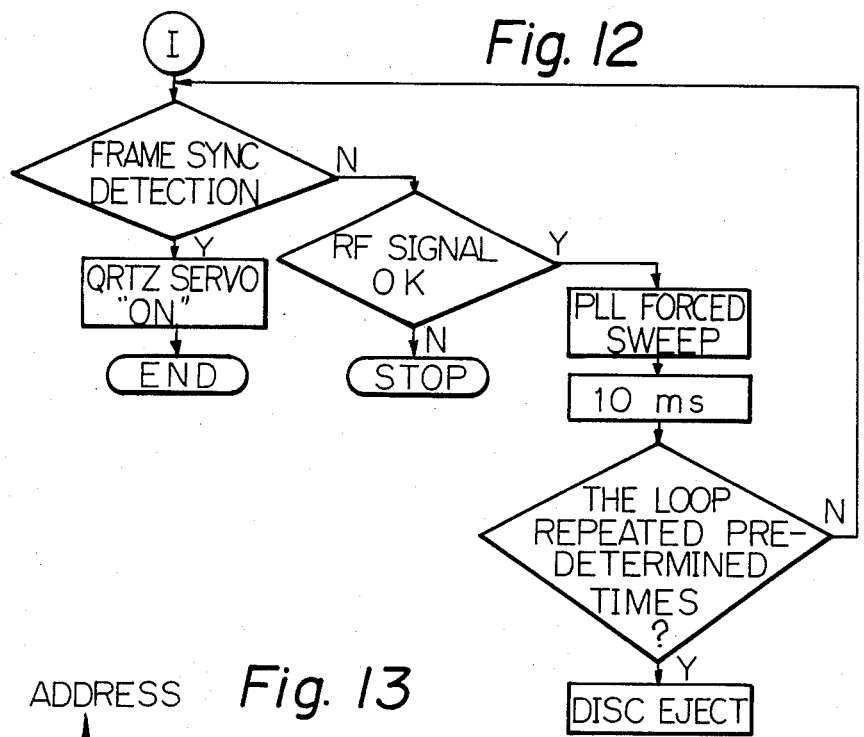

FIGS. 11 and 12, when combined, show an example of a flowchart of the operation from the start of the drive of the spindle motor to a stable state of operation in which the correct linear velocity of the recording track is obtained by using the above described circuit construction. As shown, the a Laser diode (LD) for a pickup is activated in accordance with a start command. After a period for stabilizing the Laser Diode (about 200 ms, for example), acceleration (ACC) operation is initiated and a lead-in operation of the focus servo system is also initiatled. The ACC operation is performed during a time period of about 500 ms, and then the operation is switched to the HLD operation in which the speed of rotation of the spindle motor is maintained substantially constant. Since the focus servo system will be locked at least 100 ms (a period in which the focus lens approathes to the recording disc from a most distant position) after the generation of the focus servo lead-in command signal, the speed of the rotation of the recording disc is raised during this period in accordance with the ACC operation and reaches the speed of rotation of 500 rpm after the elapse of the time period of 500 ms. This speed of rotation is almost equal to the speed which gives the rated linear velocity at the most inner side of the recording track at which the pickup is positioned during the starting period and the radius of the track is almost 24 mm.

During the HLD operation after the ACC operation, the detection of a focus servo locking state is performed. Since the starting operation is performed at a position in which the recording track is present, this detection can be performed by measuring the level of the playback RF signal. Since the pickup of the playback clock signal is not possible if the focus servo is not locked and therefore the tracking servo system can not operate, then the focus servo loop is opened and the lead-in operation of the focus servo system is repeated. If the lead-in of the focus servo failed twice, then the disc is ejected as it is determined that the starting is difficult.

On the other hand, if the focus servo is locked in this state, then the tracking servo loop is turned on and the operation is switched to the frame sync (SYNC) operation after the elapse of a period of time (after the locking of the tracking servo has been completed). Then, whether or not the playback frame sync signal is present, is determined in the demodulator 28 during the SYNC operation. If the playback frame sync signal is not detected, it means that the speed of rotation of the disc is still greatly away from the correct speed value (more than 4.6% which substantially corresponds to the sweep range of the PLL circuit: 4.3218 MHz±200 KHz), or that the PLL circuit is erroneously locked on the spurious signal, the hence switching to the quartz servo operation is not possible. Therefore, the locking state of the focus servo system is detected by checking the playback RF signal once more for detecting a state of out of focus caused by a strong external vibration and the like. If the focus servo is unlocked, the system is controlled to the stop mode of operation. If the proper playback RF signal is being produced, the forced sweep control of the PLL circuit is performed by applying the forced sweep control signal of FIG. 8 and whether or not the frame sync signal is detected, is determined, for example, after the elapse of 10 ms as previously mentioned.

More specifically, since the frame sync signal is detected if the PLL circuit is locked on the playback clock information signal, the operation of forced sweep control is performed repeatedly until the frame sync signal is detected. If, for example, the frame sync signal has not been detected during a predetermined number of repetitions of this operational loop, then the system will be placed in the eject mode of operation. This operation is provided by considering that the disc is badly soiled or that the disc is loaded upside down. If the frame sync signal is detected, the servo control is switched to the quartz servo (QRTZ) control and the disc is so driven as to provide a constant linear velocity thereafter.

The reason that the detection of the frame sync signal may become impossible even if the playback RF signal is in good condition after the starting of the frame sync servo control, is not because the linear velocity becomes correct immediately after the starting of the frame sync servo control, but because the starting up of the linear velocity takes some period of time due to the moment of inertia and the like. Further, the reason for not selecting simply a stand by operation is to pickup of the clock information signal as soon as possible.

Next, an explanation will be made as to the operation of the servo system during the so-called search operation in which the playback of a desired piece of information is enabled by searching the address information.

The address information is recorded at one bit in a specified position of each one frame signal, and one unit of the address information is made up of 98 bits contained in 98 frames. The last 16 bits of the 98 bit unit form a CRC (Cyclic Redundancy Check) signal so that an error detection is possible.

For the searching operation, a target search address has been designated previously, and a comparison of the address information is performed while effecting a slider control operation in which the the position for picking up the information is fast forwarded relative to the recording disc, in a radius direction thereof.

More specifically, the fast forward operation is effected for a short period of time, then the pickup position is fixed and the tracking servo control is effected to pick up the playback clock signal. The address information is read out and then compared with the searching address, and these series of operation is repeatedly performed. Therefore, it is desirable that the time required for enabling the reading out of the address information after the stop of the fast forward operation is as short as possible to enable reduction of the total time required for the searching operation. On the other hand, the waveform of the RF signal is significantly deformed when the pickup position is crossing the recording tracks, during the fast forward operation. Therefore, the signal is not suitable to effect the sync servo control since the servo signal of the frame sync servo system is accompanied by a significant error. For this reason, the sync servo control is turned off during the fast forward operation and the servo system is switched to the HLD operation. As mentioned before, the address information is read out after a fast forward operation of a predetermined distance, and then compared with the search address information. However, the speed of rotation of the disc during the period for reading out the address information must be equal to or close to the speed at width the rated linear velocity is obtained, due to the necessity of picking up the playback clock information during this period of reading out the address information. Therefore, the servo control system is switched to the frame sync (SYNC) servo operation during this period.

In other words, the HLD operation is selected first while effecting the fast foward operation to approach to the search address, then the HLD operation is stopped and the address information being read out from the disc is compared with the search address during the frame sync servo control operation.

In this operational sequence, since the error of the frame sync servo control is relatively large as mentioned before, and an error signal of a high voltage level is applied to the capacitor of the LPF circuit 45 shown in FIG. 3. This error signal causes a problem such that the spindle motor is supplied with a driving current of a high level upon initiation of the frame sync servo control when the fast forward operation is stopped. Therefore, the speed of rotation of the disc deviates from the proper speed largely at first and after that the servo control will be effected properly. Further, the time required for the PLL circuit 27 to lock on the clock information frequency is prolonged and consequently the time for the searching operation is prolonged, due to this high voltage level error signal.

In order to eliminate this problem, the system controller 21 is designed to produce a reset signal for discharging the capacitor of the frame sync servo system of FIG. 3 in case the sync servo control system is turned off.

Figure 13:
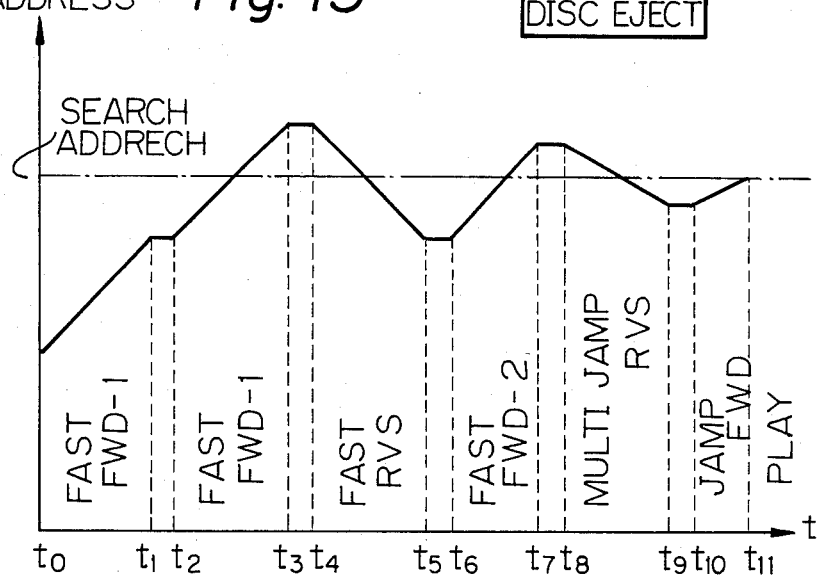
FIG. 13 is a diagram showing an exemplary operation of searching.

FIG. 13 is a diagram showing an example of the search control, especially showing the case in which the searching operation is initiated from a position having a an address smaller than the search address to be used as a target. As shown, during a time period from a time $t_0$ to a time $t_1$ which will be referred to as a fast forward (FAST FWD 1) period, the disc is rotated at a constant speed in accordance with the HLD operation while the pickup is translated along the radial direction by a predetermined distance.

During a time period from time $t_1$ to time $t_2$, the sync servo control is effected and the address information being read out is compared with the serach address. Since the search address is greater than the address being read out, the FAST FWD 1 operation is effected once more for the next time period from the time $t_2$ to a time $t_3$. For a time period from the time $t_3$ to a time $t_4$, the sync servo operation is selected and the comparison of the address information is performed. During next time period from the time $t_4$ to a time $t_5$, the disc is moved in the direction reverse to the former operations in accordance with a fast reverse (FAST RVS) operation by a predetermined distance while effecting the HLD operation. The next comparision of the address information under the sync servo control is performed during a time period from the time $t_5$ to a time $t_6$. Since the address information being read out is smaller than the search address in this state, a fast forward operation (FAST FWD 2) of a smaller distance, as compared with that of the former FAST FWD 1 operation and the FAST RVS operation, is selected while effecting the HLD operation for the next time period from the time $t_6$ to a time $t_7$. Then, the comparison of the address information is performed during next time period from the time $t_7$ to a time $t_8$, and it is detected that the address information being read out is greater than the search address, the so-called jump operation by means of the tracking mirror and the like is performed instead of the fast reverse operation. More specifically, the position at which the information is being picked up, i.e., the position of the light spot of the read out laser beam is jumped to the next recording track by changing the angle of the tacking mirror instantaneously. This jump operation is divided into two stages of operation. For the first time period from the time $t_8$ to a time $t_9$, a jump reverse operation (jump operation in the reverse direction) is effected from several tracks to tens of tracks (that is to be called multi jump reverse) and then the comparison of the address is performed. Since the jump of one recording track is performed within a short instance (around 100-500 s), the time period in which a disturbance is present in the playback picture is very short. Therefore, if the jump operations of several to tens of recording tracks are performed at a short interval such as several ms (milli seconds), the disturbance of the playback signal is present only for very short time periods having the order of a hundred micro seconds at intervals of several ms (milli seconds). Accordingly, the control of the speed of rotation of the disc in accordance with the sync servo control is sufficiently possible by using the playback signal having a disturbance of this order. By this reason, the control of the rotation of the disc during the multi jump reverse operation is performed in accordance with the sync servo control. When it is detected that the address information being read out is greater than the search address during the address comparison in a time period from the time $t_9$ to a time $t_{10}$ after the muti jump reverse, the address comparison after a jump forward operation (jump operation in the forward direction) of one recording track is repeatedly performed until the read out address information is equal to the search address. In addition, the rotation of the disc is controlled in accordance with the sync servo operation during the jump forward operation.

After reaching the search address at a time $t_{11}$, the rotation of the disc is controlled in accordance with the quartz servo (QRTZ) operation and a normal playback operation of the recorded information is performed if a PLAY mode has been selected. If a PAUSE mode has been selected, a pause operation is performed in which the jump reverse operation of one recording track at the position of the designated search address is repeatedly effected.

During this pause operation, the disturbance of the playback signal is present only during a time period of several hundreds μs (micro seconds) of the jump period in every serveral hundreds ms (milli seconds) of the one revolution of the recording disc. Therefore, the preciseness of the playback signal is sufficient for the control of the rotation of the recording disc in accordance with the quartz servo operation. Accordingly, the control mode may be switched to the quartz servo control, and also it may remain at the sync servo control. In addition, each steps of the operation illustrated in FIG. 13 is repeated until the read out address becomes greater than the search address. It should be understood that the sequence of the operation shown in FIG. 13 is only an example of the operation of the system according to the present invention, and there are numerous variations. In all cases, the essential point is to select the hold operation during the translation of the slider and the frame sync servo operation is selected during the reading out of the address information.

It will be understood from the foregoing, that according to the present invention, the quartz servo operation is selected after the frame sync servo operation on which the speed of rotation of the disc is controlled almost correctly in accordance with a result of detection of the period of the frame sync signal. Therefore, the speed of the disc is rapidly controlled to a stable state in which a correct reproduction of the recorded data. Furthermore, according to the present invention, an acceleration operation of supplying a constant high level driving current is performed at the start up period of the drive of the disc. Therefore, the speed of rotation of the disc is raised rapidly to a level near the correct speed after the starting and the detection of the clock information is made easy after reaching that level. Furthermore, in the case of the search of the address information, the hold operation is selected during a fast forward or fast reverse period and the frame sync servo control is selected during the pick up of the address information. Thus an accurate search operation is enabled in a short time period. Finally, the if the frame sync signal is not detected during the frame sync servo operation, the PLL circuit for picking up the clock signal is applied with an external disturbance for automatically release the PLL circuit from a mislock state. Thus, a correct reproduction of the clock signal is enabled and the switching of the control system operation to the quartz servo operation becomes possible.

It should be understood that the foregoing and description is illustrative only, and is not intended to limit the scope of the invention. Rather, there are numerous equivalents to the preferred embodiments, and such are intended to be covered by the appended claims.

What is claimed is:

1. A disc drive control system for controlling the drive of a disc carrying a binary digital signal including a clock information of a predetermined frequency, said digital signal including information signal portions in which positions of transition are determined in response to an information signal and synchronizing signal portions in which a maximum transition interval appears twice successively, comprising:

pickup means for detecting the digital signal on said disc;

frame sync servo signal generating means for generating a frame sync servo signal from an output signal of said pickup means, by detecting a frequency of a state in which only one positive or negative transition appears within a time period near to twice the maximum transition interval;

quartz servo signal generating means for generating a quartz servo signal by using a playback clock signal generated from the clock information of said binary digital signal and a phase difference signal indicative of a phase difference between a playback frame sync signal and a reference frame sync signal;

switch control means responsive to said frame sync servo signal and said quartz servo signal, for producing a disc drive control signal using said frame sync servo signal during a predetermined time period and using said quartz servo signal after said predetermined time period; and a disc drive means for driving the disc in accordance with said disc drive control signal.

2. A disc drive control system as set forth in claim 1, wherein a shift of operation of said switch control means for generating said disc drive control signal using said frame sync servo signal to generating the disc drive control signal using said quartz servo signal is enabled only when said synchronizing signal is reproduced using said playback clock signal.

3. A disc drive control system for controlling the drive of a disc carrying a binary digital signal, said digital signal including information signal portions in which positions of transition are determined in response to an information signal and synchronizing signal portions in which a maximum transition interval appears twice successively, comprising:

pickup means for detecting the digital signal on said disc;

frame sync servo signal generating means for generating a frame sync servo signal by detecting a frequency of a state in which only one positive or negative transition appears within a time period near to twice the maximum transition interval;

means for generating a disc drive start signal;

switch control means responsive to said disc drive start signal and said frame sync servo signal, for producing a disc drive control signal in response to said disc drive start signal for accelerating the rotation of said disc by fixing a strength of said disc drive control signal to a first predetermined level for a predetermined period and subsequently producing said disc drive control signal using said frame sync servo signal; and a disc drive means for driving the disc in accordance with said disc drive control signal.

4. A disc drive control system as set forth in claim 3, wherein said switch control means controls the strength of said disc drive control signal and maintains a speed of rotation of said disc at a second predetermined level lower than said first predetermined level, after said first predetermined time period, and wherein said disc drive control signal is produced using said frame sync servo signal only when a focus servo system for positioning said pickup means is locked when the disc is driven at a constant speed after said first predetermined time period.

5. A disc drive control system for controlling the drive of a disc carrying a binary digital signal, said digital signal including address information signal portions and synchronizing signal portions in which a maximum transition interval appears twice successively, comprising:

a pickup means for detecting the digital signal on said disc;

frame sync servo signal generating means for generating a frame sync servo signal by detecting a frequency of a state in which only one positive or negative transition appears within a time period near to twice the maximum transition interval;

pickup drive control means for positioning said pickup means at a target position in a radial direction of said disc by alternating a fast movement of said pickup means along said radial direction and an address search operation in which said fast movement is stopped and an address information recovered from said digital signal is compared with a predetermined target address;

switch control means for generating a disc drive control signal for maintaining a drive speed of said disc substantially constant by fixing a strength of said disc drive control signal during said fast movement of said pickup means and generating said disc drive control signal using said frame sync servo signal during said address search operation; and a disc drive means for driving the disc in accordance with said disc drive control signal.

6. A disc drive control system for controlling the drive of a disc carrying a binary digital signal including a clock information of a predetermined frequency, said digital signal including information signal portions in which positions of transition are determined in accordance with an information signal and synchronizing signal portions in which a maximum transition interval appears twice successively, comprising:

pickup means for detecting the digital signal on said disc;

frame sync servo signal generating means for generating a frame sync servo signal by detecting a frequency of a state in which only one positive or negative transition appears within a time period near to twice the maximum transition interval;

clock information detection means responsive to said output signal of said pickup means for detecting the clock information of the predetermined frequency and producing a playback clock signal, said clock detection means taking the form of a phase locked loop circuit which can be locked within a predetermined frequency range around said predetermined frequency of said clock information;

a control means responsive to said detection signal, for producing a disc drive control signal using said frame sync servo signal; and a disc drive means for driving the disc in accordance with said disc drive control signal, wherein an oscillation frequency of said phase locked loop circuit is forcedly swept for preventing the phase locked loop circuit from locking at a spurious frequency when aid synchronizing signal is not reproduced correctly using said playback clock signal while the disc is driven in accordance with said disc drive control signal.

* * * * *